Aug. 15, 1950   J. J. MATTSON   2,519,268
AUTO CHAINS

Filed Oct. 21, 1947   2 Sheets-Sheet 1

John J. Mattson
INVENTOR.

BY *Clarence A. O'Brien*
*and Harvey B. Jacobson*
Attorneys

Aug. 15, 1950     J. J. MATTSON     2,519,268
AUTO CHAINS

Filed Oct. 21, 1947     2 Sheets-Sheet 2

John J. Mattson
INVENTOR.

Patented Aug. 15, 1950

2,519,268

UNITED STATES PATENT OFFICE 2,519,268

AUTO CHAINS

John J. Mattson, Des Plaines, Ill.

Application October 21, 1947, Serial No. 781,072

7 Claims. (Cl. 152—224)

The present invention relates to new and useful improvements in anti-skidding or traction devices for tires of motor driven vehicles and more particularly to cross chains for the tire which may be easily and quickly applied to a tire without necessitating jacking of the wheel.

An important object of the invention is to provide groups of cross chains placed at diametrically opposite sides of a tire and means connecting the groups of chains to each other for simultaneously tightening thereof on the tire.

Another object is to provide an anti-skid and traction device which may be folded into a compact form for conveniently carrying in the vehicle, when not in use.

A further object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
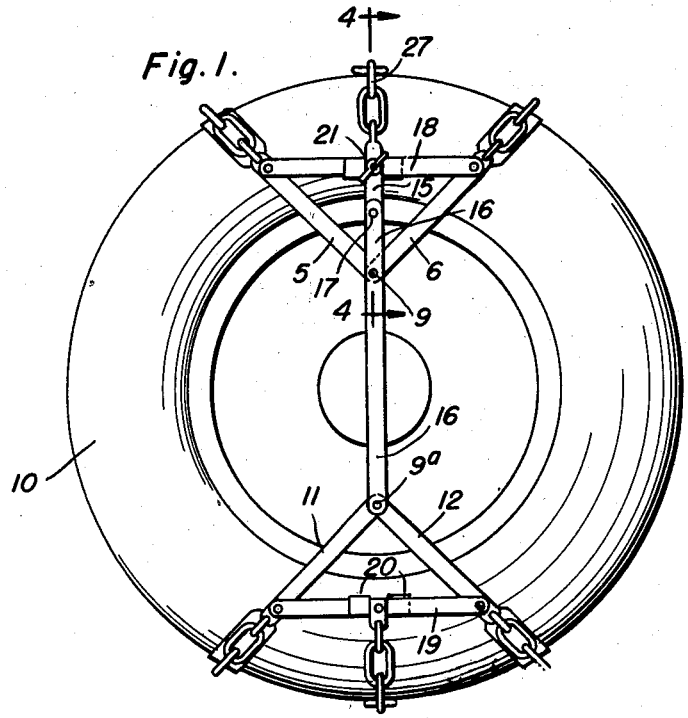
Figure 1 is a side elevational view showing the cross chains in a locked position on the outer side of a tire.
Figure 5:
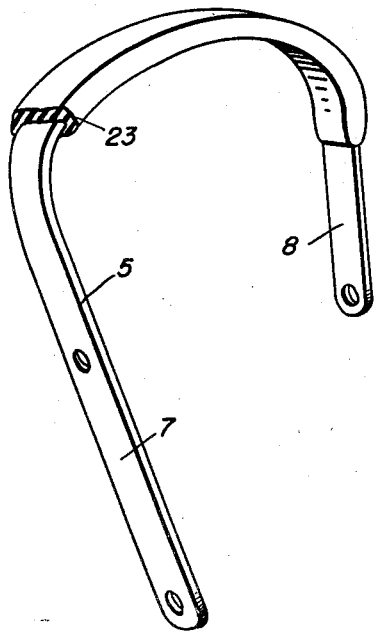
Figure 5 is an enlarged perspective view of one of the rigid cross bows holding the cross chains on the tire and Figure 6 is an enlarged perspective view of one of the chain anchoring eyes.
Figure 4:
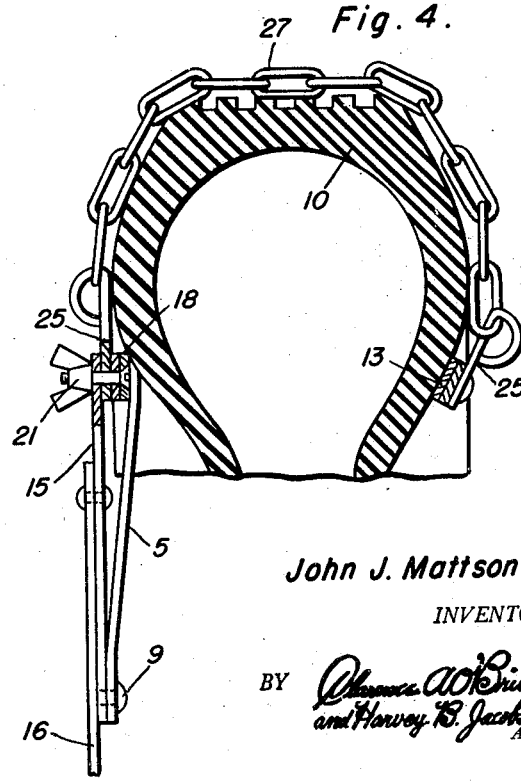
Figure 4 is an enlarged fragmentary sectional view taken on a line 4—4 of Figure 1.
Figure 3:
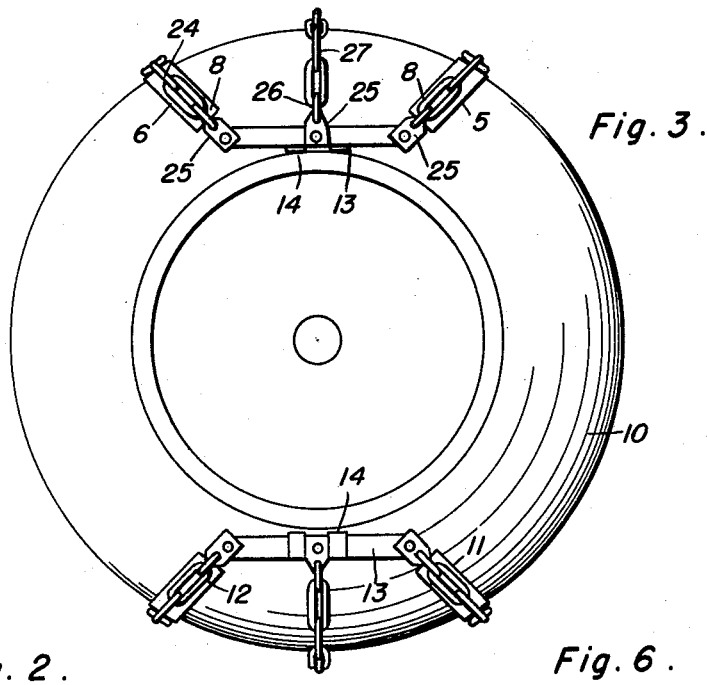
Figure 3 is a side elevational view showing the connectors for the groups of chains at the inner side of a tire.
Figure 2:
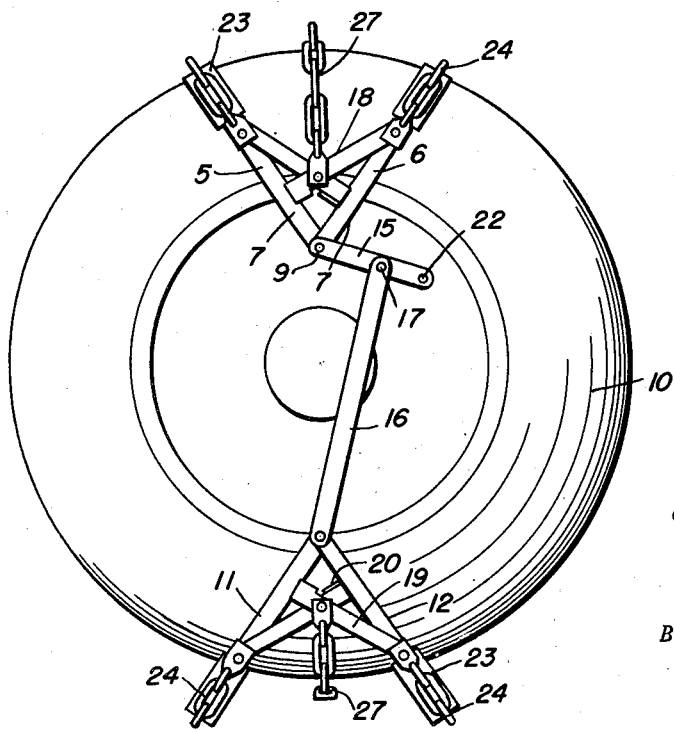
Figure 2 is a similar view showing the locking bar released for removing or applying the chains to a tire.
Figure 6:
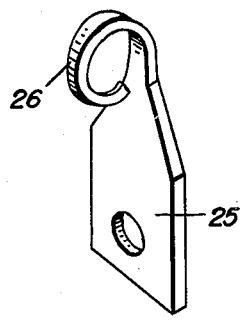

Referring now to the drawing in detail, wherein for the purpose of illustration I have disclosed a preferred embodiment of my invention, the numerals 5 and 6 designate a pair of bow shaped members, each including a long end 7 and a short end 8 pivotally connected to each other at their long ends by a pin 9 and positioned transversely on a tire 10 and numerals 11 and 12 designate a similar pair of cross bows positioned transversely on the tire diametrically opposite from the cross bows 5 and 6 and pivoted to each other at their long ends by a pin 9a. The short ends of the bows are positioned against the inner side of the tire and each pair of bows are connected to each other by a conventional foldable brace bar 13 pivoted at its outer ends to the short ends of the bows and having its sections pivoted to each other at its center for radially inward breaking movement and locked to each other against outward breaking movement by lateral lugs 14 carried at the inner end of each section of the bar and engaging the companion section.

A locking lever 15 is pivoted at one end to the pin 9 of the long ends of the bows 5 and 6 and a link 16 is pivoted at one end to an intermediate part of the lever by a pin 17 and is pivoted at its other end to the pin 9a at the long ends of the bows 11 and 12. Foldable braces 18 and 19 connect the inner portions of the long ends of the pairs of bows to each other and also include lugs 20 carried by one section of the braces and engaging the other section thereof for inward breaking movement and locking the braces against outward breaking movement.

A bolt and wing nut 21 pivotally connect the inner ends of the sections of the brace 18 to each other and the free end of lever 15 is provided with an opening 22 to also receive the bolt and wing nut 21 to lock the lever and braces in a rigid position on the tire.

Each bow is provided with a rubber cover 23 which bears against the tread portion of the tire and a cross chain 24 extends along the outer surface of each bow against the cover with its ends secured to the bow by attaching plates 25 having eyes 26 to which the end links of the cross chains are attached.

Additional plates 25 having eyes 26 are secured to the pivots at the central portion of the folding braces 13 at the inner sides of the tire and to the folding braces 18 and 19 at the outer sides of the tire and to the eyes of which central cross chains 27 are secured to extend transversely of the tire between each pair of bow members.

In the operation of the device, the long ends of the bow members 5, 6, 11 and 12 are pivoted to each other in pairs and pivoted at their ends respectively to the lever 15 and link 16. The bow members are placed on the tire 10 at diametrically opposite sides and the lever 15 swings outwardly to pull the bow members inwardly tightly against the tread of the tire.

At the same time the folding braces 13 at the inner sides of the tire and the folding braces 18 and 19 at the outer sides thereof are moved into their extended position to spread the pivoted bow-members from each other and the free end of the lever 15 is then secured by the bolt and wing nut 21 which forms the pivot for brace 18 to thereby lock the bow members and braces in clamping position on the tire.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described, and the scope of the appended claims.

Having described the invention, what is claimed as new is:

1. A traction device for vehicle wheels comprising pairs of bow shaped members positioned transversely of a tire at diametrically opposite sides thereon, one end of each of said members being pivoted to a companion member, a lever pivoted to one pair of said members at their pivoted ends, a link pivoted at one end to said lever and pivoted at its other end to the pivoted ends of the other pair of said members, said lever and link operating to move the pairs of members into and out of clamping engagement with a tire, and means connecting the free end of the lever to an adjacent pair of members to lock the members in clamping engagement.

2. A traction device for vehicle wheels comprising pairs of bow shaped members positioned transversely of a tire at diametrically opposite sides thereon, one end of each of said members being pivoted to a companion member, a lever pivoted to one pair of said members at their pivoted ends, a link pivoted at one end to said lever and pivoted at its other end to the pivoted ends of the other pair of said members, said lever and link operating to move the pairs of members into and out of clamping engagement with a tire, and means connecting the free end of the lever to an adjacent pair of bow members to lock the bow members in clamping engagement, said means comprising a folding brace for said adjacent pair of bow members and a fastening device connecting the lever to said brace, said lever holding the brace in rigid position.

3. A traction device for vehicle wheels comprising pairs of bow shaped members positioned transversely of a tire at diametrically opposite sides thereon, one end of each of said members being pivoted to a companion member, a lever pivoted to one pair of said members at their pivoted ends, a link pivoted at one end to said lever and pivoted at its other end to the pivoted ends of the other pair of said members, said lever and link operating to move the pairs of members into and out of clamping engagement with a tire, chains secured to the outer surface of said bow shaped members, and means connecting the free end of the lever to an adjacent pair of members to lock the members in clamping engagement.

4. A traction device for vehicle wheels comprising pairs of bow-shaped members positioned transversely of a tire at diametrically opposite sides thereof, one end of said members being pivoted to a companion member, foldable braces connecting the companion members to each other, and means connecting the pairs of members to each other and operating to clamp the same on a tire.

5. A traction device for vehicle wheels comprising pairs of bow-shaped members positioned transversely of a tire at diametrically opposite sides thereof, one end of said members being pivoted to a companion member, foldable braces connecting the companion members to each other, means connecting the pairs of members to each other and operating to clamp the same on a tire, and means locking the first named means in tire clamping position to one of said braces.

6. A traction device for vehicle wheels comprising pairs of bow-shaped members positioned transversely of a tire at diametrically opposite sides thereof, one end of said members being pivoted to a companion member, foldable braces connecting the companion members to each other, means connecting the pairs of members to each other and operating to clamp the same on a tire, and means locking the first named means in tire clamping position to one of said braces, and holding the braces in rigid position.

7. A traction device for vehicle wheels comprising pairs of bow-shaped members positioned transversely of a tire at diametrically opposite sides thereof, one end of said members being pivoted to a companion member, foldable braces connecting the companion members to each other, cross chains connected at their ends to said braces, means connecting the pairs of members to each other and operating to clamp the same on a tire, and means locking said first named means in tire clamping position to one of said braces.

JOHN J. MATTSON.

REFERENCES CITED

The following references are of record in the file of this patent:

UNITED STATES PATENTS

| Number | Name | Date |
| --- | --- | --- |
| 1,115,221 | Lyon | Oct. 27, 1914 |
| 2,065,810 | Karon | Dec. 29, 1936 |
| 2,244,218 | Rollings | June 3, 1941 |
| 2,426,683 | Harrop | Sept. 2, 1947 |
| 2,429,738 | Zimmer | Oct. 28, 1947 |